Jan. 3, 1933.  J. J. TRACY  1,893,255
AUTOMOTIVE VEHICLE DRIVE
Filed Nov. 12, 1927  2 Sheets-Sheet 1

INVENTOR.
James J. Tracy
BY
Fay Oberlin & Fay
ATTORNEYS.

Jan. 3, 1933.  J. J. TRACY  1,893,255
AUTOMOTIVE VEHICLE DRIVE
Filed Nov. 12, 1927   2 Sheets-Sheet 2

INVENTOR.
James J. Tracy
BY
Fay, Oberlin & Fay
ATTORNEYS.

Patented Jan. 3, 1933

1,893,255

UNITED STATES PATENT OFFICE

JAMES J. TRACY, OF SHAKER HEIGHTS, OHIO

AUTOMOTIVE VEHICLE DRIVE

Application filed November 12, 1927. Serial No. 232,800.

This invention, relating as indicated to automotive vehicles, has more particular reference to a differential drive mechanism; and it is among the objects of the invention to provide a construction in which an equally distributed application of the driving torque from the drive shaft through the respective intermediary pinions may be had, and a differential in which minimum friction and resulting maximum freedom of action is obtained. Other objects and advantages will appear as the description proceeds.

To the accomplishment of the foregoing and related ends, the invention, then, consists of the features hereinafter fully described, and particularly pointed out in the claims, the following description and the annexed drawings setting forth in detail certain structure embodying the invention, such being illustrative however of but one of the various ways in which the principle of the invention may be employed.

In said annexed drawings:—

Figure 1:
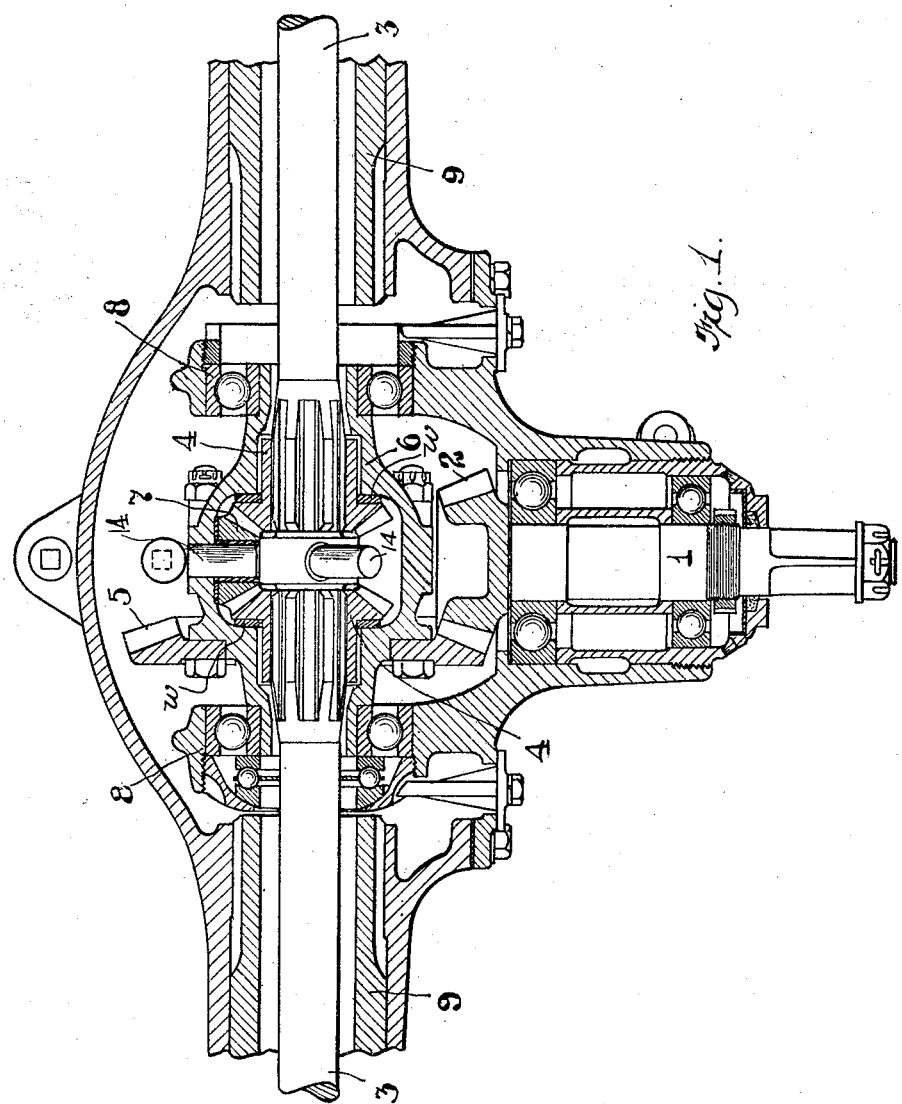
Figure 2:
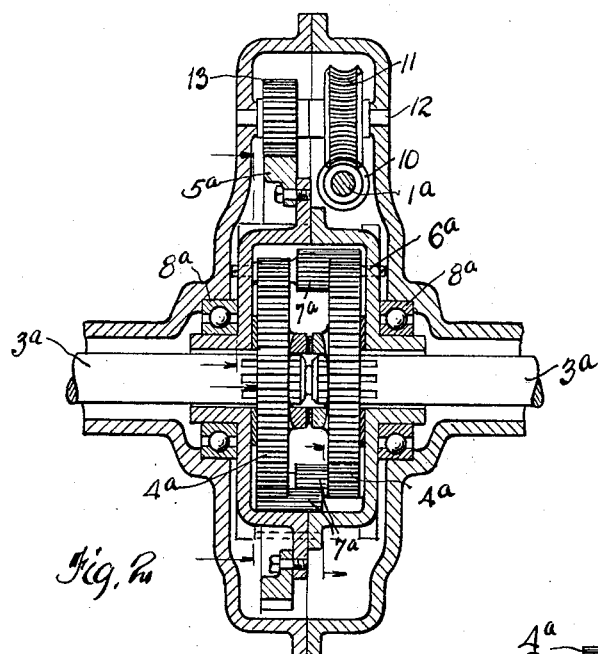
Figure 3:
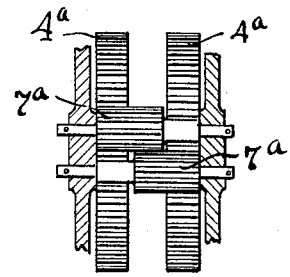
Figure 4:
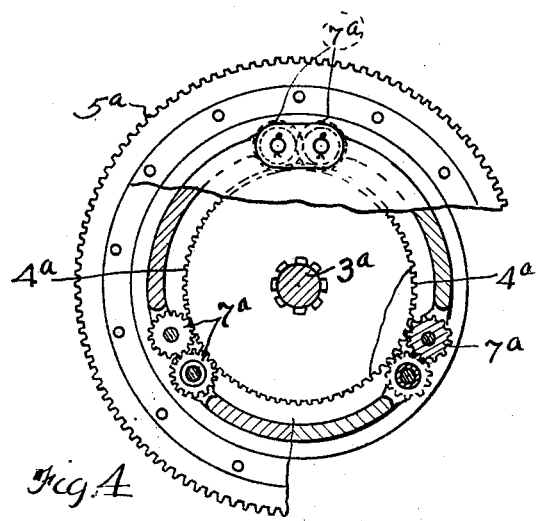

Fig. 1 is a horizontal sectional view of a differential drive embodying the present invention; Fig. 2 is a sectional view of a modification; and Figs. 3 and 4 are details in section.

In the form illustrated in Fig. 1, there is shown a drive shaft 1, deriving its power from connection with an engine not shown, and carrying a pinion 2. Axle shafts 3 extend laterally to and their outer ends are supported in traction members or wheels not shown, or are supported in the outer ends of the axle housings 9, the details thereof being immaterial here. Axially secured to the inner end of each axle in driving engagement therewith is a gear 4, preferably the gear being splined to the axle which it supports. While the precise detail of the intermediary gears may vary, a convenient arrangement may comprise a bevel ring gear 5 meshing with the drive shaft pinion 2, such bevel gear being supported on a cage 6 which in turn is mounted in ball bearings 8 and in which a series, preferably three, of differential pinions 7 is mounted on a spider 14 whose plane is transverse to the axes of the axle-shafts 3, said pinions having thrust outwardly against the inner surface of the differential cage 6. These differential pinions mesh in turn with the axle-gears 4 disposed on their opposite sides. It will be noticed that worm or spur gearing, for instance, instead of bevel gearing 2 and 5, may be used to give equivalent general results in driving cage 6.

A sleeve 9 on either side encloses its corresponding axle generally, being spaced however from any direct engagement therewith except at the outer end.

In order to allow the differential gears to center themselves upon the differential pinions, thus obtaining equal contact with each of said differential pinions, no radial bearing is provided between the differential gears and the differential cage, absorption of longitudinal thrust alone being provided for the said differential gears.

With power applied through the drive shaft 1, the meshing of pinion 2 with the bevel ring gear 5 will transmit power therethrough to the differential cage 6, which in turn will carry with it the differential spider 14 on which are mounted the differential pinions 7. These latter will then drive the differential gears 4, the pressure reaction will force the differential pinions outwardly against the inner surface of the differential cage, and the complementary pressure reaction will cause the differential gears to center themselves upon the differential pinions. The driving axles which are centered in and driven by the differential gears are thus caused to rotate. Washers $w$ may be arranged between the gears 4 and the cage 6 to facilitate relative movement and shifting.

As illustrated in Figs. 2, 3 and 4, a worm 10 on drive shaft $1^a$ meshes with a worm-gear 11 secured to a shaft 12 which also carries a pinion 13, the latter meshing with a ring gear $5^a$ on cage $6^a$ which is rotatively mounted on bearings $8^a$. Mounted in the periphery of cage $6^a$ each on a separate shaft which is journaled in said cage is a series, preferably three, of sets of differential pinions $7^a$, two in each set meshing together and each thereof meshing in turn with a respective axle-gear $4^a$, in which shafts $3^a$ are axially secured. The inner ends of shafts $3^a$ are without radial bearing support and accordingly their gears 4ª are free to center themselves upon the respective differential pinions 7ª.

With the drive shaft 1ª rotating, the worm-gear 11 and pinion 13 are correspondingly put in operation, the pinion 13 in turn actuating the ring gear 5ª and cage 6ª, which carries with it the differential pinions 7ª and the latter will actuate the axle-gears 4ª and their shafts. By reason of the radially unrestrained mounting of the axle-gears 4ª these will center themselves within and upon the differential pinions with which they respectively mesh and the load will accordingly be evenly divided amongst the differential pinions contacted respectively by each of the differential gears.

It will thus be seen that the features of the invention make possible differential gear systems in which the usual inequalities of engagement between differential pinions and gears may be obviated, and as a result smoothly-acting mechanisms are had, with a minimum of friction and superior durability.

Other modes of applying the principle of the invention may be employed, change being made as regards the details disclosed, provided the means stated in any of the following claims, or the equivalent of such, be employed.

I therefore particularly point out and distinctly claim as my invention:—

1. In differential gearing, the combination of opposite axles, a gear axially secured to the adjacent end of each axle, a differential cage, means supported by said cage for driving said axle gears, said axle gears being free to center themselves in said means, and means for rotatively driving said differential cage.

2. In differential gearing, the combination of opposite axles, a gear axially secured to the adjacent end of each axle and in driving engagement therewith, a differential cage, means supported by said cage for driving said axle gears, said axle gears being free to center themselves upon said means, and means for rotatively driving said differential cage.

3. In differential gearing, the combination of opposite axles, a gear axially secured to the adjacent end of each axle, a differential cage, differential pinions mounted in said differential cage and adapted to drive said axle gears, said axle gears being free to center themselves upon said differential pinions, and means for rotatively driving said differential cage.

4. In differential gearing, the combination of opposite axles, a gear axially secured to the adjacent end of each axle, a differential cage, a spider therein, differential pinions mounted on said spider and adapted to drive said axle gears, said axle gears being free to center themselves upon said differential pinions, and means for rotatively driving said differential cage.

5. In differential gearing, the combination of opposite axles, a gear axially secured to the adjacent end of each axle, a drive shaft, a pinion secured thereto, and an intermediary gearing meshing between said axle-gears and drive-shaft pinion, there being radial freedom of movement to allow centering equalization between the driving and driven members.

6. In differential gearing, the combination of opposite axles, a gear axially secured to the adjacent end of each axle, a drive shaft, a pinion secured thereto, and intermediary gearing meshing between said axle-gears and drive-shaft pinion, said axle-gears being loosely mounted radially to allow centering equalization.

7. In differential gearing, the combination of opposite axles, a gear axially secured to the adjacent end of each axle, a drive shaft, a pinion secured thereto, and intermediary gearing meshing between said axle-gears and drive-shaft pinion, said axle gears being unsupported radially except for gearing with which they intermesh.

8. In differential gearing, the combination of opposite axles, a gear axially secured to the adjacent end of each axle, a drive shaft, a pinion secured thereto, and differential pinions in the interconnection between said axle-gears and drive-shaft pinion, said axle-gears being unsupported radially except for the differential pinions.

9. In differential gearing, the combination of opposite axles, a gear axially secured to the adjacent end of each axle, a differential cage, a spider therein, differential pinions mounted on said spider, and means for driving said cage rotatively, said axle gears being free to center themselves radially upon said differential pinions.

10. In differential gearing, the combination of opposite axles, a bevel gear axially secured to the adjacent end of each axle, a differential cage, a spider therein, bevel differential pinions mounted on said spider, and means for driving said cage rotatively, said bevel axle gears being free to center themselves radially upon said bevel differential pinions.

Signed by me this 10th day of November, 1927.

JAMES J. TRACY.